Nov. 8, 1955 J. G. NIGRO Re. 24,085

TRAY MEANS FOR THE PRODUCTION OF FRANGIBLE, CHIPPABLE, AND FLAKABLE ARTIFICIAL ICICLE ELEMENTS

Original Filed Feb. 21, 1952 3 Sheets-Sheet 1

INVENTOR.
Joseph G. Nigro
BY David Wenzel Sellers
Attorney

TRAY MEANS FOR THE PRODUCTION OF FRANGIBLE, CHIPPABLE, AND FLAKABLE ARTIFICIAL ICICLE ELEMENTS

Original Filed Feb. 21, 1952 3 Sheets-Sheet 2

INVENTOR.
Joseph G. Nigro
BY David Stanley Holder
Attorney

TRAY MEANS FOR THE PRODUCTION OF FRANGIBLE, CHIPPABLE, AND FLAKABLE ARTIFICIAL ICICLE ELEMENTS

Original Filed Feb. 21, 1952 3 Sheets-Sheet 3

INVENTOR.
Joseph G. Nigro
BY David Manly Heller
Attorney

United States Patent Office

Re. 24,085
Reissued Nov. 8, 1955

24,085

TRAY MEANS FOR THE PRODUCTION OF FRANGIBLE, CHIPPABLE, AND FLAKABLE ARTIFICIAL ICICLE ELEMENTS

Joseph G. Nigro, Ocean Side, N. Y., assignor to Gits Molding Corporation, Chicago, Ill., a corporation of Illinois Original No. 2,674,862, dated April 13, 1954, Serial No. 272,871, February 21, 1952. Application for reissue February 2, 1955, Serial No. 485,838

12 Claims. (Cl. 62—108.5)

Matter enclosed in heavy brackets [ ] appears in the original patent but forms no part of this reissue specification; matter printed in italics indicates the additions made by reissue.

My invention relates to artificial [,] icicle means, and methods, and means for the production or manufacture of same.

An important object of my invention is to provide a frangible, chippable, and flakable, artificial icicle element, which is, preferably, a wafer-like structure of parallelepipedic configurationtion, and is relatively thin to facilitate fracture thereof into ice chips, or ice flakes, or ice crystals of irregular configuration.

Another object of my invention is to provide a frangible, chippable, and flakable, artificial icicle means comprised of a number of substantially parallelepipedic units being interconnected by strengthening core or web means.

A further object of my invention is to provide tray means, which is made of flexible material, and adapted to be responsive to reciprocal torsional movements about its geometric center, in order to chip, or flake, or break the said icicle means or elements into irregularly-shaped crystals.

A still further object of my invention is to provide tray means of the aforementioned character, which may be used in concert with hollow extension handle means in order to increase the leverage to transmit the power necessary for torsionally twisting the said tray means about its geometeric center in the process of producing ice chips, flakes, or irregular small crystal particles.

A still further object of my invention is to provide a cover means supported removably on the top of the said tray means, which will not militate against the torsional twisting movements to which the said tray may be subjected, so as not to interfere with the production of ice chips or flakes, at the same time preventing them from dropping out of the tray means, thus maintaining them for subsequent disposal of the said ice chips or flakes.

A still further object of my invention is to provide tray means of the aforementioned character, which is inclosable in a flexible bag, to permit when flexing and twisting reciprocally the said tray means, the said bag *to collect* [in collecting] the ice chips, or flakes and *maintain* [maintaining] them therein; so when the tray is removed the ice chips and flakes will remain in the bag for further use and disposal thereof.

A still further object of my invention is to provide tray means which will produce wafer-like elements, susceptible of being frangible, chippable, and flakable.

A still further object of my invention is to provide tray means of the aforementioned character, which is provided with web means therein, adapted to space the said tray means from the bottom of another similar tray means superimposed thereupon, so as not to interfere with the congealing action in the freezer unit when the said trays are placed in superimposition within the freezing compartment of a deep freeze unit.

A still further object of my invention is to provide tray means for producing artificial icicle means, composed of wafer-like portions susceptible of being frangible, chippable, and flakable; the said artificial icicle means consisting of a multiplicity of substantially parallelepipedic elements interconnected by core means in order to further intensify the flaking and chipping action, when the same are subjected to light blows or torsional movements to produce ice chips or ice flakes.

A still further object of my invention is to provide tray means for producing the icicle means or elements comprising my invention.

A still further object of my invention is to produce artificial icicle means, which is readily frangible, chippable, and flakable, when subjected to a series of light blows when the same is held within a flexible and waterproof sack or like unit.

A still further object of my invention is to produce a flexible freezer type of tray, equipped to freeze frangible artificial icicles, as well as a method for flaking the said artificial icicles when the same is subjected to stresses, strains, blows or impacts.

Other objects, ancillary features and inherent advantages of my invention will become apparent from an examination of the accompanying drawings, bearing further elucidation in the ensuing description, wherein like symbols are used to designate like parts, and in which.

Figure 1:
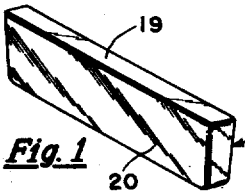
Fig. 1 is a perspective view of one form of artificial icicle, comprising my invention.
Figure 4:
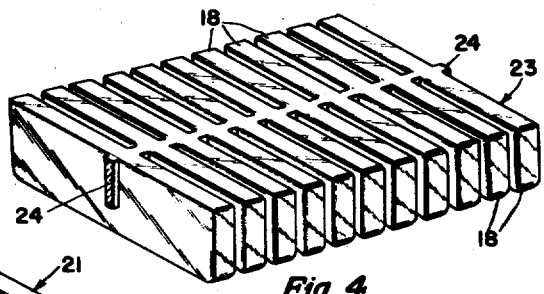
Fig. 4 is another form of artificial icicle comprising my invention which is characterized by core means of substantially quadrilateral cross-sectional configuration with spaces [45] therebetween.
Figure 2:
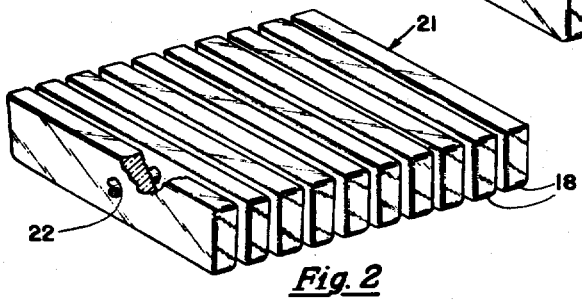
Fig. 2 is a perspective view of the icicle illustrated in Fig. 1 produced in multiple form and interconnected by reinforcing core means of substantially cylindrical formation, with spaces [46] therebetween.

Referring to the various views, in Fig. 1 is illustrated a frangible, chippable, and flakable artificial wafer-like icicle element. *The* [, the] said element is preferably of parallelepipedic construction of wafer thinness as indicated at 19 and preferably having a base surface 20, and generally designated 18.

The illustration of Fig. 1 is the basis of the further modifications illustrated in the various views and the tray means for the manufacture of the said artificial icicle element.

Figure 5:
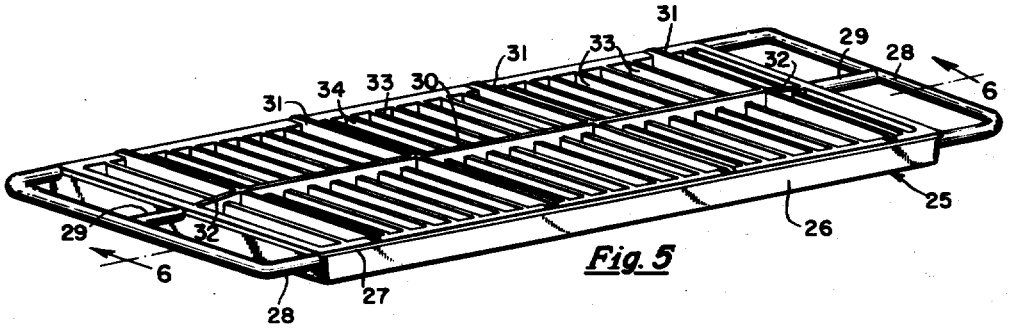
Fig. 5 is a perspective view of tray means used in connection with the manufacture or production of my invention.
Figure 6:
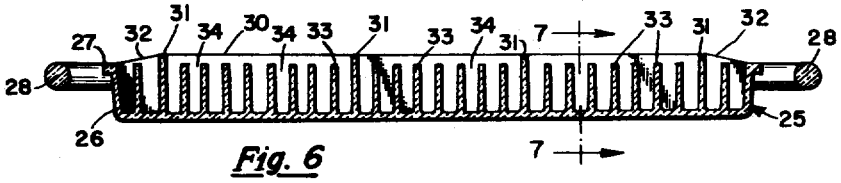
Fig. 6 is a cross-sectional view taken, substantially, on the lines 6—6 of Fig. 5.
Figure 8:
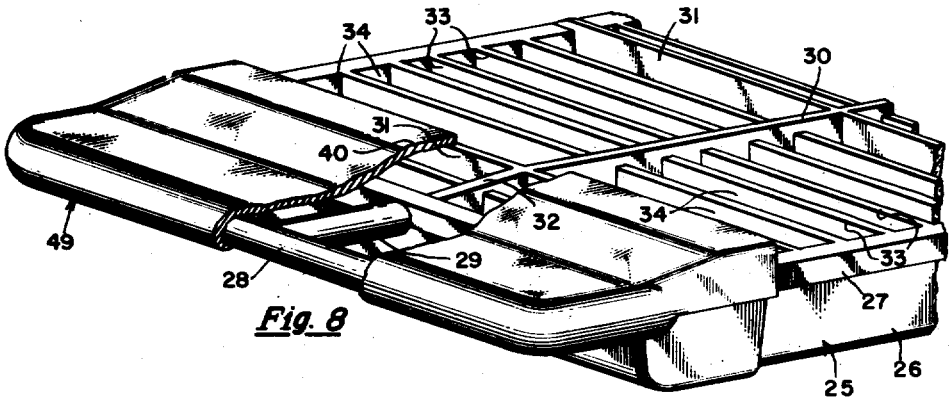
Fig. 8 is a perspective view of the end of the tray illustrated in Fig. 5, indicating an attachment or accessory which may be utilized effectively to incerase the leverage when the tray means is subjected to torsional and twisting movements about its geometric center.
Figure 7:
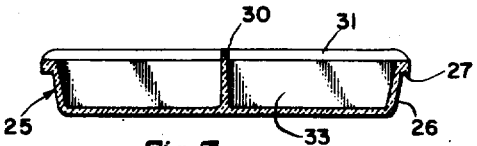
Fig. 7 is a transverse cross-sectional view taken, substantially, on the lines 7—7 of Fig. 6.

The element illustrated in Fig. 1 may be produced in a tray 25 illustrated in Figures 5 and 6, and consists of a tray portion 26, having a reinforced rib 27.

The said tray is preferably molded of a plastic material, although other materials which will permit the tray to be flexed reciprocally and torsionally about its geometric center, would also be satisfactory.

The tray is provided with two handle elements, one at each end, designated 28, and having a cross bar or sectional reinforcement 29 to provide strength and rigidity in view of the strain or stress to which the tray may be subjected.

The tray portion 26 is subdivided longitudinally by a median web portion 30, which is raised at its central portion, and tapers downwardly toward the end of the tray as indicated at 32.

It is also subdivided by webs 31, which are raised to the same level as the web 30, so as to permit similar ice trays 25, to be placed in a superimposed position within a freezer unit, without the trays adhering to one another; that is, to prevent adherence of the trays, one with its adjacent tray on which it may be superimposed.

In that connection it is to be noted that any liquid with which the tray may be filled *would* level off with the ribbed edge 27 thereof, so that the level of the congealed icicle to be formed will be no higher than the level of the partitions 33, which are further subdivided into wafer freezing compartments 34, in which the icicle elements illustrated in Fig. 1 are formed.

Figure 10:
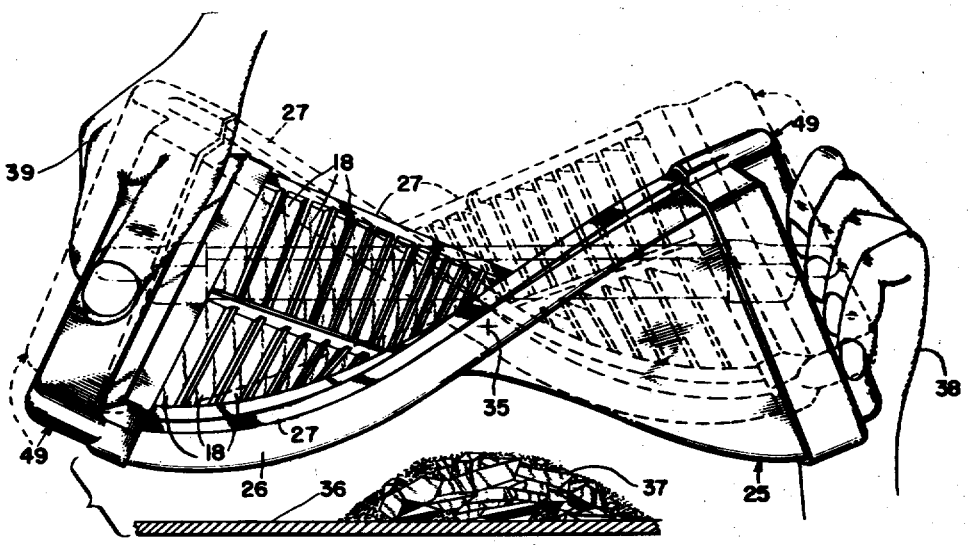
Fig. 10 is a view illustrating in full and dotted lines the reciprocal movements of the hands in subjecting the tray means to reciprocatory torsional and twisting actions about its geometric center, showing the resultant flakes, chips, and irregular ice crystals produced from the method illustrated in this view.

After the tray has been filled with water and the water allowed to congeal, the handles 28 may be firmly grasped, and by subjecting the tray 25 to the torsional movements illustrated, namely, by the twisting movements illustrated by the full and dotted lines in Fig. 10, the hands 38 and 39 reciprocally twisting the tray about the geometric center 35, the ice chips, flakes, and crystals designated 37 will be formed, and they may be deposited on a table 36 or other surface.

The tray may also be used in connection with the accessory, or auxiliary handle, generally, designated 49. The said handle element is hollow, and is of a formation 40 and 41 of web-like structure adapted to fit configuratively as shown at 42 the handle element 28, and also fit over the beveled portion 32 of the central web 30, thus giving the user a greater leverage, and imparting greater rigidity between wafer portions for exerting the power necessary to twist the tray about its geometric center or locus 35 as indicated in Fig. 10.

Figure 11:
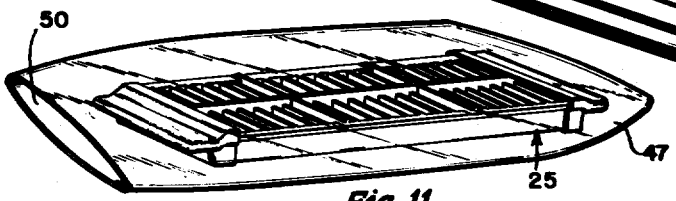
Fig. 11 is a view of a tray, or tray means, inserted preferably in a transparent, flexible type of plastic bag, in order to collect the ice chips, flakes, and irregular crystals formed within the bag when the tray is subjected to the torsional and twisting movements indicated in Fig. 10.

The tray element illustrated in Fig. 11 may be placed in a plastic sack or bag or any flexible water-proof bag 47, and with the mouth of the bag 50 closed, the same may also be subjected to the operation indicated in Fig. 10, in which case the tray can ultimately be removed leaving the flakes, or crystals 37 within the pouch or bag 47 for storing in a deep freeze unit or for instant consumption.

Figure 12:
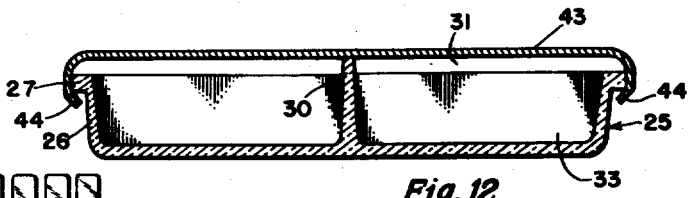
Fig. 12 is an illustration of a slight modification indicating a cover, so attached removably to the tray means, that it will not impede the operation illustrated in Fig. 10, and *that will* simultaneously prevent the crystals, chips, and flakes from being dispersed, hence maintaining them within the tray for use when the cover means is removed.
Figure 3:
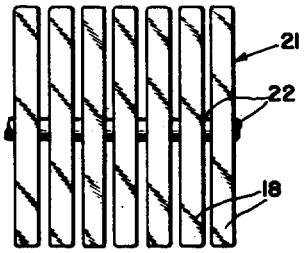
Fig. 3 is a top elevational view of Fig. 2.
Figure 13:
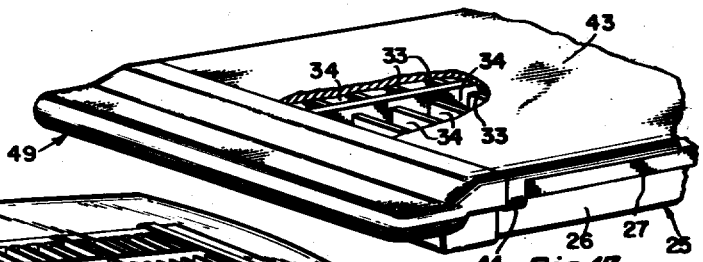
Fig. 13 is a perspective view of the end of a tray equipped with the handle accessories, herein before mentioned, and the cover mentioned supra.
Figure 9:
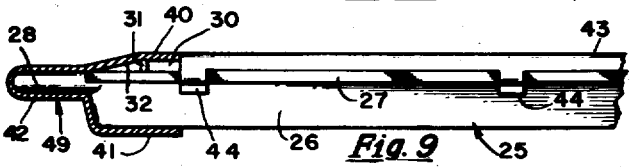
Fig. 9 is a fragmentary, side view of the tray means showing the accessory or handle element in *cross-section* [cross-sectional] in order to more clearly depict the structural relationship of the parts.

A still further arrangement is illustrated in Figures 9, 12 and 13, where the tray is provided with a cover plate 43, provided with lugs 44, which may be positioned at each end and at the center thereof, so that the same can be snapped over the ribbed portion 27 of the tray, to permit snapping on-and-off the said cover 43.

The said cover as it is particularly attached, does not impede the operation indicated in Fig. 10, and at the same time does not prevent the flakes, chips, and crystals formed from leaving the confines of the tray until the cover is removed, when the chips, flakes, and crystals may be deposited in a glass container or a bag 47.

Figure 14:
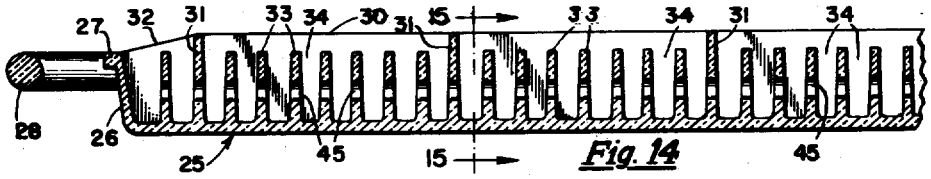
Fig. 14 is a longitudinal, cross-sectional, and fragmentary view of tray means modified to produce the icicle illustrated in Figures 2 and 3; it being a view looking in the direction of arrows 14—14 on Fig. 15.
Figure 15:
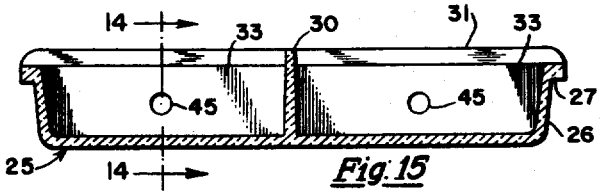
Fig. 15 is a transverse, cross-sectional view taken, substantially, on the lines 15—15 of Fig. 14.

A tray structure slightly modified with respect to that illustrated in Figures 5 and 6, is the tray illustrated in Figures 14 and 15. In view it will be noted that the icicle elements are reinforced by a core interconnecting the compartments 34, since the webs 31 and 33 are provided with central bores, which will cause ice-like cores to interconnect adjacent surfaces of icicle element 18.

This type of icicle element may require slightly greater pressure for the frangibility thereof, but it will also aid in affording a superior chipping action, proportional to the strains and stresses to which the tray may be subjected.

In other words, the brittle property of the icicle element 18 is attributable to its frangibility when subjected to strains and stresses by the torsional movements of the trays; the elements being inflexible cause the breakage thereof into irregular crystals, flakes, and chips.

The core means 22, formed within the bored openings 45 of the tray, tend to unite the frangible elements 11, making the structure slightly more rigid and increasing its brittleness, thereby intensifying the breaking, chipping, and flaking effects resulting when this tray is subjected to the reciprocal, torsional movements as indicated in Fig. 10.

Figure 16:
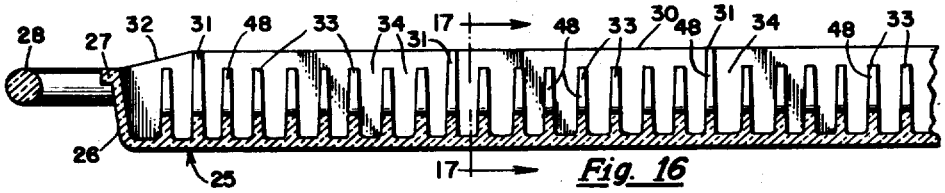
Fig. 16 is another slightly modified, fragmentary, cross-sectional view of tray means, which is adapted to produce the artificial icicle means illustrated in Fig. 4, and is a cross-sectional view taken, susbtantially, on the lines 16—16 of Fig. 17.
Figure 17:
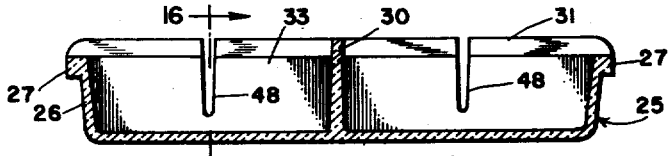
Fig. 17 is a transverse, cross-sectional view taken, substantially, on the lines 17—17 of Fig. 16.

A slightly modified form of tray means is indicated in Figures 16 and 17. The core means 22 being replaced by substantially rectangular cross-sectional web formation in the icicle 23 and designated 24, resulting by slotting the webs 33 and 31 as seen in Fig. 17.

A slight taper is inherent in the slotted portion 48 of the tray, so that the tray, when manufactured, may be readily removed from the mold. The tray illustrated in Figures 14 and 15 would require slightly more expense to produce the bores 45 within the webs 33 and 31, at the same time maintaining the outer end walls of the tray free of openings.

In actual use, any of the trays illustrated, may be filled with water to the level of the beaded portion 27, then placed in superimposition in the compartment of a deep freeze unit, the same being allowed to freeze so that the liquid will congeal. The trays are then ready for use and may be subjected to torsional movements to produce the flakes, chips, and ice crystals.

The artificial icicles designated 21 may also be produced in the tray illustrated and subjected to the same torsional flexure reciprocally in order to produce flakes, chips, and crystals.

The element 18 may be sold and separately manufactured as indicated in Fig. 1, without the tray means. *They* [they] may be placed in a bag such as 47 and subjected to blows by a light mallet or by striking the same against a hard surface in order to produce flakes, chips, and ice crystals. The same procedure may be adopted for the icicles generally illustrated and designated 23 or 21.

The brittle property of the icicle will result in ice chips, flakes, and crystals formed when the same is subjected to blows or impacts, or, the said icicles, chips, and flakes may be produced by the use of the tray 25, or as modified in Figures 14 and 15, or as modified in Figures 16 and 17.

The tray may also be used with a sack 47, in which the chips, flakes, and crystals will be collected and the tray can be removed so that the resulting mass of chips, flakes, and crystals may be retained in the pouch 47, and dispense through the mouth 50 thereof.

With each of the trays illustrated, the handles 49 may also be used to intensify the leverage, as well as the power to be exerted thereby when subjected to the torsional and twisting movements indicated in Fig. 10.

The trays illustrated may also be used in connection with the cover plate 43, which will retain the crystals, and not permit the same to be dissipated from the tray, until removal thereof is desired, that is, when the cover 43 is removed and the ice flakes, chips, and crystals deposited on a table surface 36, or within a bag 47, or any other storage means, or the chips, flakes, and crystals may be immediately utilized in cooling liquids, drinks, etc.

I believe I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modifications, improvements, or alterations, falling within the purview of the foregoing description; my invention to be limited only by the subjoined claims.

Having thus disclosed and revealed my invention, what I claim as new and desire to secure by Letters Patent is:

1. Tray means for producing ice chips flakes and crystals, comprising a tray element of flexible material provided with manipulating handle portions at each end thereof, the said tray element having a liquid retaining compartment, *said liquid retaining compartment having an axis that extends between said ends, said liquid retaining compartment being* subdivided by partition means into a multiplicity of comparatively narrow liquid congealing compartments of wafer-like narrowness, capable of producing congealed wafers of such thinness so that the said tray means subsequent to congealing of liquid therein when subjected to torsional strains and stresses by torsional movements about *said axis* [its geometric locus] cause the congealed icicles formed therein to be resolved into ice chips flakes and crystals of relatively small and irregular configuration readily miscible with liquids, the said tray element being provided with a median web portion extending beyond the top surface thereof, and a few of said partition means evenly distributed extending into the same geometric plane of the top portion of the said median web portion to permit superimposition of like tray means preventing adhesion thereof.

2. Tray means for producing ice chips flakes and crystals, comprising a tray element of flexible material provided with manipulating handle portions at each end thereof, the said tray element having a liquid retaining compartment, *said liquid retaining compartment having an axis that extends between said ends, said liquid retaining compartment being* subdivided by partition means into a multiplicity of comparatively narrow liquid congealing compartments of wafer-like narrowness, capable of producing congealed wafers of such thinness so that the said tray means subsequent to congealing of liquid therein when subjected to torsional strains and stresses by torsional movements about *said axis* [its geometric locus] cause the congealed icicle formed therein to be resolved into ice chips flakes and crystals of relatively small and irregular configuration readily miscible with liquids, the longitudinal edges of the said tray element being provided with reinforced rib portions, and cover plate means provided with lug means to engage the said rib portions in snap-on and off relationships but not millitating against the torsional strains to which the said tray means may be subjected simultaneously confining ice chips flakes and crystals formed as a result of the torsional movements.

[3. Tray means for producing ice chips flakes and crystals, comprising a tray element of flexible material provided with manipulating handle portions at each end thereof, the said tray element having a liquid retaining compartment subdivided by partition means into a multiplicity of comparatively narrow liquid congealing compartments of wafer-like narrowness, capable of producing congealed wafers of such thinness so that the said tray means subsequent to congealing of liquid therein when subjected to torsional strains and stresses by torsional movements about its geometric locus cause the congealed icicle formed therein to be resolved into ice chips flakes and crystals of relatively small and irregular configuration readily miscible with liquids, the said tray element being provided with a median web portion extending beyond the top surface thereof, and a few of said partition means evenly distributed extending into the same geometric plane of the top portion of the said median web portion to permit superimposition of like tray means preventing adhesion thereof, the longitudinal edges of the said tray element being provided with reinforced rib portions, and cover plate means provided with lug means to engage the said rib portions in snap-on and off relationships but not militating against the torsional strains to which the said tray means may be subjected simultaneously confining ice chips flakes and crystals formed as a result of the torsional movements.]

4. Tray means for producing ice chips flakes and crystals, comprising a tray element of flexible material provided with manipulating handle portions at each end thereof, the said tray element having a liquid retaining compartment, *said liquid retaining compartment having an axis that extends between said ends, said liquid retaining compartment being* subdivided by *partition* [partion] means into a multiplicity of comparatively narrow liquid congealing compartments of wafer-like narrowness, capable of producing congealed wafers of such thinness so that the said tray means subsequent to congealing of liquid therein when subjected to torsional strains and stresses by torsional movements about *said axis* [its geometric locus] cause the congealed icicle formed therein to be resolved into ice chips flakes and crystals of relatively small and irregular configuration readily miscible with liquids, and hollow auxiliary handle means adapted to fit removably over the said handle portions to increase the leverage to more effectively intensify the strains and stresses to which the said tray means may be subjected to increase the efficiency of production of ice chips flakes and crystals.

[5. Tray means for producing ice chips flakes and crystals, comprising a tray element of flexible material provided with manipulating handle portions at each end thereof, the said tray element having a liquid retaining compartment subdivided by partition means into a multiplicity of comparatively narrow liquid congealing compartments of wafer-like narrowness, capable of producing congealed wafers of such thinness so that the said tray means subsequent to congealing of liquid therein when subjected to torsional strains and stresses by torsional movements about its geometric locus cause the congealed icicle formed therein to be resolved into ice chips flakes and crystals of relatively small and irregular configuration readily miscible with liquids, the said tray element being provided with a median web portion extending beyond the top surface thereof, and a few of said partition means evenly distributed extending into the same geometric plane of the top portion of the said median web portion to permit superimposition of like tray means preventing adhesion thereof, and hollow auxiliary handle means adapted to fit removably over the said handle portions to increase the leverage to more effectively intensify the strains and stresses to which the said tray means may be subjected to increase the efficiency of production of ice chips flakes and crystals.]

[6. Tray means for producing ice chips flakes and crystals, comprising a tray element of flexible material provided with manipulating handle portions at each end thereof, the said tray element having a liquid retaining compartment subdivided by partition means into a multiplicity of comparatively narrow liquid congealing compartments of wafer-like narrowness, the said tray means subsequent to congealing of liquid therein when subjected to torsional strains and stresses by torsional movements about its geometric locus cause the congealed icicle formed therein to be resolved into ice chips flakes and crystals of relatively small and irregular configuration readily miscible with liquids, the longitudinal edges of the said tray element being provided with reinforced rib portions, and cover plate means provided with lug means to engage the said rib portions in snap-on and off relationships but not militating against the torsional strains to which the said tray means may be subjected simultaneously confining ice chips flakes and crystals formed as a result of the torsional movements, and hollow auxiliary handle means adapted to fit removably over the said handle portions to increase the leverage to more effectively intensify the strains and stresses to which the said tray means may be subjected to increase the efficiency of production of ice chips flakes and crystals.]

[7. Tray means for producing ice chips flakes and crystals, comprising a tray element of flexible material provided with manipulating handle portions at each end thereof, the said tray element having a liquid retaining compartment subdivided by partition means into a multiplicity of comparatively narrow liquid congealing compartments of wafer-like narrowness, the said tray means subsequent to congealing of liquid therein when subjected to torsional strains and stresses by torsional movements about its goemetric locus cause the congealed icicle formed therein to be resolved into ice chips flakes and crystals of relatively small and irregular configuration readily miscible with liquids, the said tray element being provided with a median web portion extending beyond the top surface thereof, and a few of said partition means evenly distributed extending into the same geometric plane of the top portion of the said median web portion to permit superimposition of like tray means preventing adhesion thereof, the longitudinal edges of the said tray element being provided with reinforced rib portions and cover plate means provided with lug means to engage the said rib portions in snap-on and off relationships but not militating against the torsional strains to which the said tray means may be subjected simultaneously confining ice chips flakes and crystals formed as a result of the torsional movements, and hollow auxiliary handle means adapted to fit removably over the said handle portions to increase the leverage to more effectively intensify the strains and stresses to which the said tray means may be subjected to increase the efficiency of production of ice chips flakes and crystals.]

*8. A tray that can receive liquid and that can hold and confine that liquid while that liquid is congealed to ice and that can thereafter respond to twisting to convert said ice into ice chips or flakes while said ice is in situ and that comprises a liquid retaining compartment with a continuous bottom and with upstanding end walls and side walls, said liquid retaining compartment having an axis that extends longitudinally of said liquid retaining compartment between said end walls, a plurality of plates that are integral with said bottom of said liquid retaining compartment and that extend upwardly from said bottom of said liquid retaining compartment, said plates being long and*

*narrow and extending transversely of said axis, said plates being closely adjacent each other in confronting relation to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of elongated, vertically directed gaps in said liquid retaining compartment, said gaps being spaced inwardly of said upstanding walls of said liquid retaining compartment, said gaps having the upper ends thereof disposed above the centers of said plates and having the lower ends thereof disposed below the centers of said plates in said liquid retaining compartment, a number of said gaps being in register with each other to define an elongated longitudinally extending liquid congealing passageway in said liquid retaining compartment, said gaps having the narrow dimensions thereof at least one half the thickness of said spaces, whereby congealed cores in said passageway will be of sufficient strength relative to the strength of said congealed wafers in said spaces to constitute reinforcing cores, said tray being made of flexible material whereby said end walls of said liquid retaining compartment can be reciprocally rotated about said axis of said liquid retaining compartment to recurrently distort said liquid retaining compartment and the said plates therein to subject the congealed liquid therein to torsional stresses and strains, said longitudinally extending passageway defined by said registered gaps interconnecting a number of said liquid congealing spaces defined by said plates to assure the formation of an icicle with a longitudinally extending reinforcing core that interconnects a multiplicity of readily frangible congealed wafers of sufficient thinness that the said distortion of said liquid retaining compartment and the said plates therein during reciprocal rotation of said end walls of said liquid retaining compartment breaks said congealed wafers into chips and flakes of relatively small and irregular configuration that are readily miscible with liquids, said plates reinforcing and stiffening said bottom of said liquid retaining compartment to minimize local upward bowing of said bottom of said liquid retaining compartment, said upstanding walls spacing said bottom a predetermined distance below the upper edges of said upstanding walls, said plates stiffening and reinforcing said bottom to substantially maintain said predetermined spacing between said bottom and said upper edges of said upstanding walls during distortion of said liquid retaining compartment, said plates coacting with said bottom and with said upstanding walls to apply substantially similar breaking forces to the wafers in said spaces during reciprocal rotation of said end walls, whereby uniform breaking of said wafers into chips and flakes is assured, each of said plates providing a stiffening and reinforcing action for said bottom, said plates being so closely adjacent each other that the stiffening and reinforcing action which said plates provide for said bottom minimizes losses in the transmission of torsional forces through said bottom to said plates and thereby increases the breaking forces which said plates transmit through said gap-defining surfaces thereof to said reinforcing core and thence to the portions of said wafers intermediate the ends of said wafers.*

*9. A tray that can receive liquid and that can hold and confine that liquid while that liquid is congealed to ice and that can thereafter respond to twisting to convert said ice into ice chips or flakes while said ice is in situ and that comprises a liquid retaining compartment with a continuous bottom and with upstanding end walls and side walls, said liquid retaining compartment having an axis that extends longitudinally of said liquid retaining compartment between said end walls, a plurality of plates that are integral with said bottom of said liquid retaining compartment and that extend upwardly from said bottom of said liquid retaining compartment, said plates being long and* narrow and extending transversely of said axis, said plates being closely adjacent each other in confronting relation to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of elongated, vertically directed gaps in said liquid retaining compartment, said gaps having the upper ends thereof disposed above the centers of said plates and having the lower ends thereof disposed below the centers of said plates, in said liquid retaining compartment, a number of said gaps being in register with each other to define an elongated longitudinally extending liquid congealing passageway in said liquid retaining compartment, said gaps being of substantial width relative to the thickness of said spaces whereby congealed cores in said passageway will be of sufficient strength relative to the strength of said congealed wafers in said spaces to constitute reinforcing cores, said tray being made of flexible material whereby said end walls of said liquid retaining compartment can be reciprocally rotated about said axis of said liquid retaining compartment to recurrently distort said liquid retaining compartment and the said plates therein to subject the congealed liquid therein to torsional stresses and strains, said longitudinally extending passageway defined by said registered gaps interconnecting a number of said liquid congealing spaces defined by said plates to assure the formation of an icicle with a longitudinally extending reinforcing core that interconnects a multiplicity of readily frangible congealed wafers of sufficient thinness that the said distortion of said liquid retaining compartment and the said plates therein during reciprocal rotation of said end walls of said liquid retaining compartment breaks said congealed wafers into chips and flakes of relatively small and irregular configuration that are readily miscible with liquids said plates reinforcing and stiffening said bottom of said liquid retaining compartment to minimize local upward bowing of said bottom of said liquid retaining compartment, said plates coacting with said bottom and with said upstanding walls to apply substantially similar breaking forces to the wafers in said spaces during reciprocal rotation of said end walls, whereby uniform breaking of said wafers into chips and flakes is assured, said upstanding walls spacing said bottom a predetermined distance below the upper edges of said upstanding walls, said plates stiffening and reinforcing said bottom to substantially maintain said predetermined spacing between said bottom and said upper edges of said upstanding walls during distortion of said liquid retaining compartment.

10. A tray that can receive liquid and that can hold and confine that liquid while that liquid is congealed to ice and that can thereafter respond to twisting to convert said ice into ice chips or flakes while said ice is in situ and that comprises a liquid retaining compartment with a bottom and with upstanding walls, said liquid retaining compartment having an axis that extends between two of said upstanding walls of said liquid retaining compartment, a plurality of plates that are integral with said bottom of said liquid retaining compartment and that extend upwardly from said bottom of said liquid retaining compartment, said plates being long and narrow, said plates being closely adjacent each other to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of elongated, vertically directed gaps in said liquid retaining compartment, said gaps having the upper ends thereof disposed above the centers of said plates and having the lower ends thereof disposed below the centers of said plates and in said liquid retaining compartment, a number of said gaps being in register with each other to define an elongated longitudinally extending liquid congealing passageway in said liquid retaining compartment, said gaps being of substantial width relative to the thickness of said spaces whereby congealed cores in said passageway will be of sufficient strength relative to the strength of said congealed wafers in said spaces to constitute reinforcing cores, said tray being made of flexible material whereby said two upstanding walls of said liquid retaining compartment can be reciprocally rotated about said axis of said liquid retaining compartment to recurrently distort said liquid retaining compartment and the said plates therein to subject the congealed liquid therein to torsional stresses and strains, said longitudinally extending passageway defined by said registered gaps interconnecting a number of said liquid congealing spaces defined by said plates to assure the formation of an icicle with a longitudinally extending reinforcing core that interconnects a multiplicity of readily frangible congealed wafers of sufficient thinness that the said distortion of said liquid retaining compartment and the said plates therein during reciprocal rotation of said two upstanding walls of said liquid retaining compartment breaks said congealed wafers into chips and flakes of relatively small and irregular configuration that are readily miscible with liquids, said upstanding walls spacing said bottom a predetermined distance below the upper edges of said upstanding walls, said plates stiffening and reinforcing said bottom to substantially maintain said predetermined spacing between said bottom and said upper edges of said upstanding walls during distortion of said liquid retaining compartment.

11. A tray that can receive liquid and that can hold and confine that liquid while that liquid is congealed to ice and that can thereafter respond to twisting to convert said ice into ice chips or flakes while said ice is in situ and that comprises a liquid retaining compartment with a bottom and with upstanding walls, said liquid retaining compartment having an axis that extends between two of said upstanding walls of said liquid retaining compartment, a plurality of plates that are integral with said bottom of said liquid retaining compartment and that extend upwardly from said bottom of said liquid retaining compartment, said plates being long and narrow, said plates being closely adjacent each other to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of gaps in said liquid retaining compartment, said gaps having the upper ends thereof disposed above the centers of said plates in said liquid retaining compartment, said gaps being of substantial width relative to the thickness of said spaces whereby congealed cores in said gaps will be of sufficient strength relative to the strength of said congealed wafers in said spaces to constitute reinforcing cores, said tray being made of flexible material whereby said two upstanding walls of said liquid retaining compartment can be reciprocally rotated about said axis of said liquid retaining compartment to recurrently distort said liquid retaining compartment and the said plates therein to subject the congealed liquid therein to torsional stresses and strains, a number of said liquid congealing spaces defined by said plates being interconnected by said gaps to assure the formation of an icicle with a reinforcing core that interconnects a multiplicity of readily frangible congealed wafers of sufficient thinness that the said distortion of said liquid retaining compartment and the said plates therein during reciprocal rotation of said two upstanding walls of said liquid re-

*taining compartment breaks said congealed wafers into chips and flakes of relatively small and irregular configuration that are readily miscible with liquids, said gaps being spaced inwardly of said upstanding walls of said liquid retaining compartment, each of said plates providing a stiffening and reinforcing action for said bottom, said plates being so closely adjacent each other that the stiffening and reinforcing action which said plates provide for said bottom minimizes losses in the transmission of torsional forces through said bottom to said plates and thereby increases the breaking forces which said plates transmit through said gap-defining surfaces thereof to said reinforcing core and thence to the portions of said wafers intermediate the ends of said wafers.*

*12. A tray that can receive liquid and that can hold and confine that liquid while that liquid is congealed to ice and that can thereafter respond to twisting to convert said ice into ice chips or flakes while said ice is in situ and that comprises a liquid retaining compartment with a continuous bottom and with upstanding end walls and side walls, said liquid retaining compartment having an axis that extends longitudinally of said liquid retaining compartment between said end walls, a plurality of plates that are integral with said bottom of said liquid retaining compartment and that extend upwardly from said bottom of said liquid retaining compartment, said plates being long and narrow and extending transversely of said axis, said plates being closely adjacent each other in confronting relation to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said tray being made of flexible material whereby said end walls of said liquid retaining compartment can be reciprocally rotated about said axis of said liquid retaining compartment to recurrently distort said liquid retaining compartment and the said plates therein to subject the congealed liquid therein to torsional stresses and strains, said plates reinforcing and stiffening said bottom of said liquid retaining compartment to minimize local upward bowing of said bottom of said liquid retaining compartment, said liquid congealing spaces defined by said plates assuring the formation of a multiplicity of readily frangible wafers of sufficient thinness that the said distortion of said liquid retaining compartment and the said plates therein during reciprocal rotation of said end walls of said liquid retaining compartment breaks said congealed wafers into chips and flakes of relatively small and irregular configuration that are readily miscible with liquids, said plates coacting with said bottom and with said upstanding walls to apply substantially similar breaking forces to the wafers in said spaces during reciprocal rotation of said end walls whereby uniform breaking of said wafers into chips and flakes is assured, said upstanding walls spacing said bottom a predetermined distance below the upper edges of said upstanding walls, said plates stiffening and reinforcing said bottom to substantially maintain said predetermined spacing between said bottom and said upper edges of said upstanding walls during distortion of said liquid retaining compartment, each of said plates providing a stiffening and reinforcing action for said bottom, said plates being so closely adjacent each other that the stiffening and reinforcing action which said plates provide for said bottom minimizes losses in the transmission of torsional forces through said bottom to said plates and thereby increases the breaking forces which said plates transmit to said wafers.*

*13. A tray that can receive liquid and that can hold and confine that liquid while that liquid is congealed to ice and that can thereafter respond to twisting to convert said ice into ice chips or flakes while said ice is in situ and that comprises a liquid retaining compartment with a bottom and with upstanding walls, said liquid retaining compartment having an axis that extends between two of said upstanding walls of said liquid retaining compartment, a plurality of plates that are integral with said bottom of said liquid retaining compartment and that extend upwardly from said bottom of said liquid retaining compartment, said plates being long and narrow, said plates being closely adjacent each other to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of gaps in said liquid retaining compartment, said gaps being spaced inwardly of said upstanding walls of said liquid retaining compartment, said gaps having the upper ends thereof disposed above the centers of said plates in said liquid retaining compartment, said gaps having the narrow dimensions thereof at least one half the thickness of said spaces whereby congealed cores in said gaps will be of sufficient strength relative to the strength of said congealed wafers in said spaces to constitute reinforcing cores, said tray being made of flexible material whereby said two upstanding walls of said liquid retaining compartment can be reciprocally rotated about said axis of said liquid retaining compartment to recurrently distort said liquid retaining compartment and the said plates therein to subject the congealed liquid therein to torsional stresses and strains, a number of said liquid congealing spaces defined by said plates being interconnected by said gaps to assure the formation of an icicle with a reinforcing core that interconnects a multiplicity of readily frangible congealed wafers of sufficient thinness that the said distortion of said liquid retaining compartment and the said plates therein during reciprocal rotation of said two upstanding walls of said liquid retaining compartment breaks said congealed wafers into chips and flakes of relatively small and irregular configuration that are readily miscible with liquids, each of said plates providing a stiffening and reinforcing action for said bottom, said plates being so closely adjacent each other that the stiffening and reinforcing action which said plates provide for said bottom minimizes losses in the transmission of torsional forces through said bottom to said plates and thereby increases the breaking forces which said plates transmit through said gap-defining surfaces thereof to said reinforcing core and thence to the portions of said wafers intermediate the ends of said wafers.*

*14. A tray that can receive liquid and that can hold and confine that liquid while that liquid is congealed to ice and that can thereafter respond to twisting to convert said ice into ice chips or flakes while said ice is in situ and that comprises a liquid retaining compartment with a bottom and with upstanding walls, said liquid retaining compartment having an axis that extends between two of said upstanding walls of said liquid retaining compartment, a plurality of plates that are integral with said bottom of said liquid retaining compartment and that extend upwardly from said bottom of said liquid retaining compartment, said plates being long and narrow and extending transversely of said axis, said plates being closely adjacent each other in confronting relation to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of elongated, vertically directed gaps in said liquid retaining compartment, said gaps being spaced inwardly of said upstanding walls of said liquid retaining compartment, said gaps having the upper ends thereof disposed above the centers of said plates and having the lower ends*

*thereof disposed below the centers of said plates in said liquid retaining compartment, a number of said gaps being in register with each other to define an elongated longitudinally extending liquid congealing passageway in said liquid retaining compartment, said gaps being of substantial width relative to the thickness of said spaces whereby congealed cores in said passageway will be of sufficient strength relative to the strength of said congealed wafers in said spaces to constitute reinforcing cores, said tray being made of flexible material whereby said two upstanding walls of said liquid retaining compartment can be reciprocally rotated about said axis of said liquid retaining compartment to recurrently distort said liquid retaining compartment and the said plates therein to subject the congealed liquid therein to torsional stresses and strains, said longitudinally extending passageway defined by said registered gaps interconnecting a number of said liquid congealing spaces defined by said plates to assure the formation of an icicle with a longitudinally extending reinforcing core that interconnects a multiplicity of readily frangible congealed wafers of sufficient thinness that the said distortion of said liquid retaining compartment and the said plates therein during reciprocal rotation of said two upstanding walls of said liquid retaining compartment breaks said congealed wafers into chips and flakes of relatively small and irregular configuration that are readily miscible with liquids, said longitudinally extending passageway being substantially perpendicular to said two upstanding walls of said liquid retaining compartment, and being substantially perpendicular to the said plates defining said number of liquid congealing spaces, each of said plates providing a stiffening and reinforcing action for said bottom, said plates being so closely adjacent each other that the stiffening and reinforcing action which said plates provide for said bottom minimizes losses in the transmission of torsional forces through said bottom to said plates and thereby increases the breaking forces which said plates transmit through said gap-definining surfaces thereof to said reinforcing core and thence to the portions of said wafers intermediate the end of said wafers.*

*15. A tray that can receive liquid and that can hold and confine that liquid while that liquid is congealed to ice and that can thereafter respond to twisting to convert said ice into ice chips or flakes while said ice is in situ and that comprises a liquid retaining compartment with a bottom and with upstanding walls, said liquid retaining compartment having an axis that extends between two of said upstanding walls of said liquid retaining compartment, a plurality of plates that are integral with said bottom of said liquid retaining compartment and that extend upwardly from said bottom of said liquid retaining compartment, said plates being long and narrow and extending transversely of said axis, said plates being closely adjacent each other in confronting relation to define a multiplicity of narrow liquid congealing spaces of wafer-like narrowness, said spaces being of a thickness substantially smaller than either the length or breadth thereof whereby each of said spaces receives one of a multiplicity of small quantities of liquid which can be congealed to form a readily frangible congealed wafer, said plates having surfaces that define a plurality of elongated, vertically directed gaps in said liquid retaining compartment, said gaps being spaced inwardly of said upstanding walls of said liquid retaining compartment, said gaps having the upper ends thereof disposed above the centers of said plates and having the lower ends thereof disposed below the centers of said plates in said liquid retaining compartment, a number of said gaps being in register with each other to define an elongated longitudinally extending liquid congealing passageway in said liquid retaining compartment, said gaps being of substantial width relative to the thickness of said spaces whereby congealed cores in said passageway will be of sufficient strength relative to the strength of said congealed wafers in said spaces to constitute reinforcing cores, said tray being made of flexible material whereby said two upstanding walls of said liquid retaining compartment can be reciprocally rotated about said axis of said liquid retaining compartment to recurrently distort said liquid retaining compartment and the said plates therein to subject the congealed liquid therein to torsional stresses and strains, said longitudinally extending passageway defined by said registered gaps interconnecting a number of said liquid congealing spaces defined by said plates to assure the formation of an icicle with a longitudinally extending reinforcing core that interconnects a multiplicity of readily frangible congealed wafers of sufficient thinness that the said distortion of said liquid retaining compartment and the said plates therein during reciprocal rotation of said two upstanding walls of said liquid retaining compartment breaks said congealed wafers into chips and flakes of relatively small and irregular configuration that are readily miscible with liquids, said longitudinally extending passageway being substantially perpendicular to said two upstanding walls of said liquid retaining compartment.*

*16. A tray that can receive liquid and that can hold and confine that liquid while that liquid is congealed to ice and that can thereafter respond to twisting to convert said ice into ice chips or flakes while said ice is in situ and that comprises a liquid retaining compartment with a bottom and with upstanding walls, said liquid retaining compartment having an axis that extends between two of said upstanding walls of said liquid retaining compartment, a plurality of plates that are integral with said bottom of said liquid retaining compartment and that extend upwardly from said bottom of said liquid retaining compartment, said plates being long and narrow, said plates being closely adjacent each other to define a multiplicity of narrow liquid congealing spaces of wafer-like narrowness, said spaces being of a thickness substantially smaller than either the length or breadth thereof, said plates having surfaces that define a plurality of gaps in said liquid retaining compartment, said gaps having the upper ends thereof disposed above the centers of said plates in said liquid retaining compartment, said gaps being of substantial width relative to the thickness of said spaces whereby congealed cores in said gaps will be of sufficient strength relative to the strength of said congealed wafers in said spaces to constitute reinforcing cores, said tray being made of flexible material whereby said two upstanding walls of said liquid retaining compartment can be reciprocally rotated about said axis of said liquid retaining compartment to recurrently distort said liquid retaining compartment and the said plates therein to subject the congealed liquid therein to torsional stresses and strains, a number of said liquid congealing spaces defined by said plates being interconnected by said gaps to assure the formation of an icicle with a reinforcing core that interconnects a multiplicity of readily frangible congealed wafers of sufficient thinness that the said distortion of said liquid retaining compartment and the said plates therein during reciprocal rotation of said two upstanding walls of said liquid retaining compartment breaks said congealed wafers into chips and flakes of relatively small and irregular configuration that are readily miscible with liquids.*

References Cited in the file of this patent or the original patent

UNITED STATES PATENTS

| | | |
|---|---|---|
| 1,521,712 | Pownall | Jan. 6, 1925 |
| 1,777,483 | Copeman | Oct. 7, 1930 |
| 1,820,134 | Geyer | Aug. 25, 1931 |
| 1,931,053 | Berkeley | Oct. 17, 1933 |
| 1,939,445 | Henne | Dec. 12, 1933 |
| 1,945,605 | Geyer | Feb. 6, 1934 |

(Other references on following page)

UNITED STATES PATENTS

| | | |
|---|---|---|
| 2,048,412 | Sissmann | July 21, 1936 |
| 2,049,934 | Witherspoon | Aug. 4, 1936 |
| 2,067,074 | Chilton | Jan. 5, 1937 |
| 2,131,855 | Hummel | Oct. 4, 1938 |
| 2,134,101 | Buchanan | Oct. 25, 1938 |
| 2,181,697 | Kavalir | Nov. 28, 1939 |
| 2,238,512 | Uline | Apr. 15, 1941 |
| 2,253,397 | Reeves | Aug. 19, 1941 |
| 2,303,935 | Hedlund | Dec. 1, 1942 |
| 2,405,272 | Smith | Aug. 6, 1946 |
| 2,431,278 | Raver | Nov. 18, 1947 |

| | | |
|---|---|---|
| 2,433,211 | Gits | Dec. 23, 1947 |
| 2,503,693 | Van Lennep | Apr. 11, 1950 |
| 2,505,947 | De Brocke | May 2, 1950 |
| 2,536,217 | Pownall | Jan. 2, 1951 |
| 2,538,939 | Hallock | Jan. 23, 1951 |
| 2,587,233 | Schweller | Feb. 26, 1952 |
| 2,587,852 | Jahn | Mar. 4, 1952 |
| 2,596,021 | Gaugler | May 6, 1952 |
| 2,613,512 | Gaugler | Oct. 14, 1952 |
| 2,615,310 | Sampson | Oct. 28, 1952 |
| 2,633,715 | Foster | Apr. 7, 1953 |
| 2,702,991 | Foster | Mar. 1, 1955 |